April 29, 1941. A. G. BLANCHARD 2,239,774

FUEL CUTOFF MEANS

Filed June 5, 1939

INVENTOR

Alva G. Blanchard

Patented Apr. 29, 1941

2,239,774

UNITED STATES PATENT OFFICE 2,239,774

FUEL CUTOFF MEANS

Alva G. Blanchard, Shreveport, La.

Application June 5, 1939, Serial No. 277,333

2 Claims. (Cl. 137—153)

The invention relates to mechanism for controlling the admission of fuel to the combustion chamber of steam generators and more particularly to a construction which is operable to cut off the admission of fuel when the liquid level within the generator exceeds a predetermined limit.

It is a general object of the invention to provide in combination with a steam generator means operable by pressure generated therein for cutting off the fuel supply when the liquid level changes beyond predetermined limits.

It is also an object to provide in such combination a fuel control valve which is normally retained in open position but which is movable to a closed position by virtue of a pressure connection with the generator.

Another object is to provide a fuel control valve which is so constructed that the fuel pressure will maintain the valve closed when closure has taken place by pressure generated within the steam generator.

Another object is to provide a fuel control valve which, when closed is held in closed position by the pressure of the fuel supply and which must thereafter be opened manually to admit additional fuel thru the supply line.

Another object is to provide a fuel control valve having a movable stem which is operatively connected to a pressure chamber so that the stem will be moved to close the valve when there is pressure in the chamber.

These and other objects will be apparent from the following description taken in connection with the drawing in which.

Figure 1:
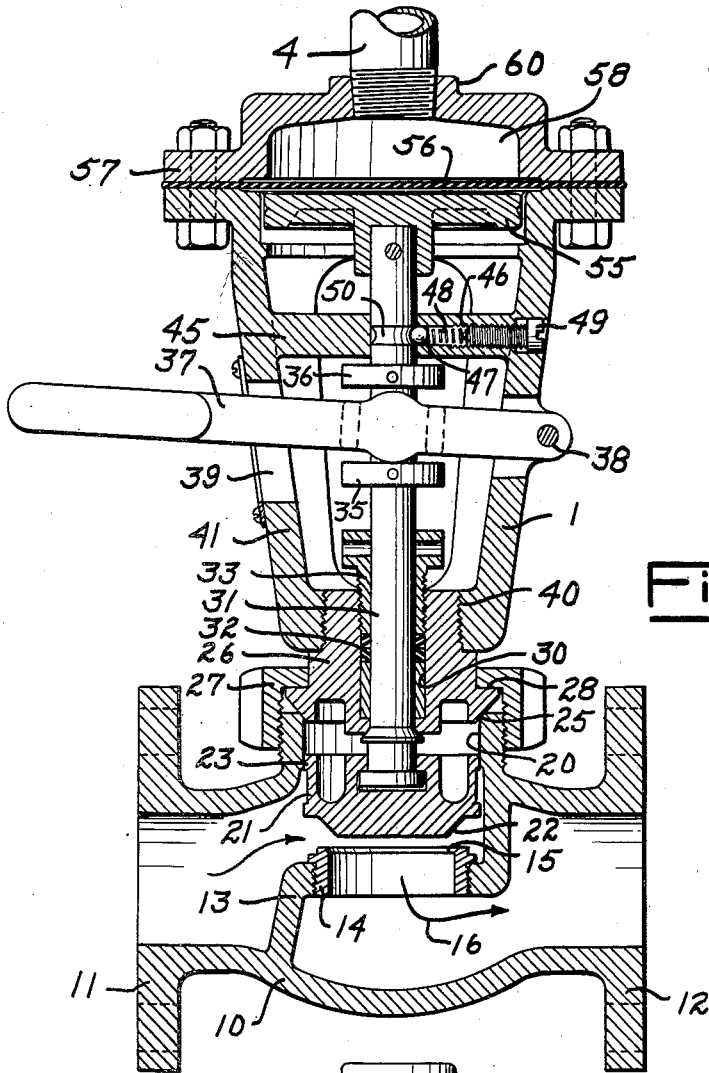
Fig. 1 is a sectional view of a valve construction comprising an element of one embodiment of the invention.
Figure 2:
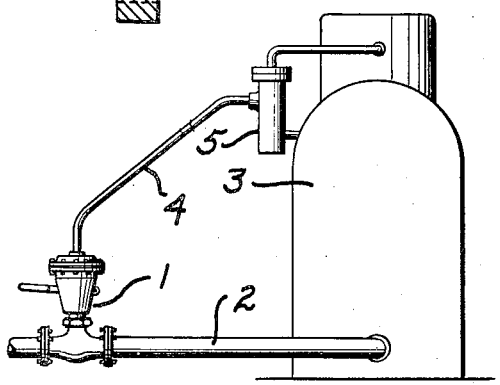
Fig. 2 illustrates the invention as comprising a fuel line in which the valve of Fig. 1 is utilized, such valve and fuel line being operatively connected to a steam generator.

Referring further to the drawing, the invention comprises a fuel control valve 1 connected in the fuel supply line 2 by means of which a suitable fuel is supplied to the boiler or steam generator 3. A conduit 4 is attached through a liquid level valve 5 to the pressure chamber within the boiler and to a pressure chamber within the valve 1 to serve a purpose that will be more fully apparent by further reference to the construction illustrated in Fig. 1. The liquid level valve 5 may be of any desired type and may be so constructed that actuation thereof takes place either when the liquid within the generator becomes too high or too low.

The fuel control valve, generally designated as 1 is shown in Fig. 1, as comprising a valve body 10 which is connected in the fuel line 2 by means of flanges 11 and 12 which are secured to complementary flanges on sections of pipe comprising the fuel line. This valve body has a transverse wall 13 in which is fitted a valve seat 14 having a seating surface 15 at the upper edge thereof. The valve seat 14 lies generally in a plane extending longitudinally of the body 10 whereby fluid passing therethru flows in the direction generally indicated by the arrows 16, a feature which enables the functioning of the valve in a manner to be more fully described.

The side opening 20 in the valve body 10 is coaxial with the valve seat 14 and is of such diameter as to slidingly receive the valve member 21 which is provided with a seating surface 15 on the valve seat 14 so that engagement of the valve member 21 with the seating surface 15 closes the passage thru the valve.

The upper end of the opening 20 is beveled at 25 for engagement with the complementary surface on the plug 26 which serves as a closure for the opening and which is secured in place by means of coupling member 27 engaging the shoulder 28 on the plug 26 and secured to the body 10 by means of threads on the outer surface of the boss surrounding the opening 20.

The plug 26 serves as a closure for the opening 20 and has a central opening 30 to receive valve stem 31 which is rotatably attached to the valve member 21 and extends outwardly therethru. In order to prevent leakage of fluid along the valve stem 31, packing 32 surrounds the valve stem within the bore 30 and is held tightly in place by means of the packing gland 33.

The upper end of the plug 26 is threaded at 40 for connection with a spider 41 which surrounds the valve stem 31. This spider has a transverse wall 45 having a central opening thru which the valve stem 31 passes. In the wall 45 is a radial opening 46 to receive a latching ball 47, a spring 48 and a threaded plug 49 which serve to hold the ball 47 in a peripheral groove 50 in the valve stem 31. By suitable adjustment of the threaded plug 49 it is believed apparent that the valve stem is releasably locked with the valve member 21 in spaced relation with the valve seat 14 until sufficient pressure is exerted axially of the valve stem to force the ball 47 outwardly against the force exerted by the spring 48.

The valve stem 31 terminates at its upper end in a head 55 of which the upper surface is closely adjacent a diaphragm 56 clamped upon the upper end of the spider by means of a hollow cap 57 which forms with the diaphragm a pressure chamber 58.

The cap 57 is provided with a threaded boss 60 to which the conduit 4 is attached so that pressure generated within the boiler 3 will be exerted upon the diaphragm 56 within the pressure chamber 58.

The operation of the construction thus far described is believed apparent. Attention is directed to the fact that the threaded plug 49 will be so adjusted that the movable elements of the valve 1 will be releasably held against movement under the influence of gravity or other external forces tending to close the valve. If, however, the liquid level within the generator fluctuates beyond predetermined limits, the liquid level valve 5 will operate and admit steam pressure to the chamber 58 in the valve 1, whereupon the diaphragm 56 will flex and the head 55 will be moved downwardly together with the valve stem 31 and the valve member 21 so that the valve will be closed.

It is to be noted that when the seating surface 22 is moved into engagement with the seating surface 15 upon the seat ring 14 the upper portion 23 of the valve member 21 moves from within the opening 20 and thus permits the incoming fuel to exert a pressure upon the upper surface of the valve member 21. The pressure exerted by the fuel is thus instrumental in maintaining the valve member 21 upon its seat and the valve will remain closed unless forcibly lifted against this pressure.

In order to provide desirable functioning of the valve, means is provided for reopening the valve manually, it being intended that this feature will cause the operator to know the condition giving rise to the cutting off of the fuel supply so that such condition will be removed before the valve is manually opened to resume normal operation of the system.

The valve stem 31 is provided with spaced collars 35 and 36 which are attached thereto and which are adapted to be engaged by a lever 37 pivotally connected to the spider at 38 and extending outwardly therefrom thru a slot 39.

When the valve closes, as already described, the lever 37 moves to its lowermost position within the slot 39, and as explained, the valve can thereafter be opened manually by lifting this lever until the locking ball 47 again engages within the recess 50 in the valve stem 31.

Broadly the invention comprehends a construction including a steam generator and a liquid level valve, together with means operable by extremes in fluctuation of liquid level within the generator for cutting off the fuel supply thereto, such means being so constructed that manual opening thereof is necessary for the resumption of normal operation.

What is claimed is:

1. A fuel control cutoff valve for steam generators comprising a valve body, a valve seat therein, an opening in the body coaxial with the valve seat, a valve assembly including a valve member slidably fitting within the opening, a closure for the opening outwardly from the valve member, a valve stem attached to the valve member and extending outwardly through the closure member, means for releasably locking the valve stem to hold the valve open, a diaphragm chamber adapted to receive pressure fluid from the steam generator, a head on said valve stem engageable by the diaphragm of said chamber to move the valve stem from engagement by the locking means and move the valve from within said opening so that the valve assembly moves to close the valve member upon its seat.

2. A fuel cutoff valve for steam generators comprising a valve assembly including a valve having a valve stem extending outwardly therefrom, said valve stem being movable axially to open and close the valve, a spider attached to the valve, a releasable lock between said spider and valve stem to hold the valve in open position, a pressure chamber at the outer end of the spider, said pressure chamber including a diaphragm movable from pressure within the chamber, a head on the valve stem engageable by the diaphragm to release the lock between the spider and the valve stem, and a lever pivotally attached at one end to the spider and operably connected to the valve stem for manual return of the valve assembly to open position.

ALVA G. BLANCHARD.